United States Patent [19]
Frazier

[11] 3,975,817
[45] Aug. 24, 1976

[54] FLUID-ACTUATED TOOL CHANGER WITH DUAL AXIS OF ROTATION

[75] Inventor: James L. Frazier, Los Alamitos, Calif.

[73] Assignee: Houdaille Industries, Inc., Buffalo, N.Y.

[22] Filed: Oct. 9, 1974

[21] Appl. No.: 513,405

[52] U.S. Cl. .............................. 29/568; 214/1 BD; 214/1 QF
[51] Int. Cl.² ........................................ B23Q 3/157
[58] Field of Search .......... 29/568; 214/1 BC, 1 BD, 214/1 QF

[56] References Cited
UNITED STATES PATENTS

| | | | |
|---|---|---|---|
| 3,339,273 | 9/1967 | Knosp .................................. | 29/568 |
| 3,449,822 | 6/1969 | Lawmann et al. ..................... | 29/568 |
| 3,546,774 | 12/1970 | Stofferle et al. ...................... | 29/568 |
| 3,619,898 | 11/1971 | Perry et al. ............................ | 29/568 |

Primary Examiner—Othell M. Simpson
Assistant Examiner—Z. R. Bilinsky
Attorney, Agent, or Firm—Hill, Gross, Simpson, Van Santen, Steadman, Chiara & Simpson

[57] ABSTRACT

An automatic tool transport mechanism for a machine tool having an operating axis, in which a tool is to be transferred between the operating axis of such a machine and the storage structure, with the tool being supplied to the operating station on such operating axis, or to such a storage structure on a storage axis thereof, at least a portion of which is spaced from such operating axis, and employing a transfer arm adapted to be mounted on a machine tool for movement in a predetermined path from a first position adjacent said operating axis to a second position adjacent said space portion of said storage axis, tool gripping means carried by said arm movable in a second predetermined path operative to correspondingly orient such tool gripping means and a tool carried thereby on either said operating axis when said arm is in said first position, or on said storage axis when said arm is in said second position, fluid actuated means, i.e. pneumatic or hydraulic, being provided for effecting transfer movement of said transfer arm and for selectively actuating said gripping means to and from tool-gripping and tool-releasing position when said gripping means is operatively disposed on either such an operating axis or such a storage axis.

14 Claims, 9 Drawing Figures

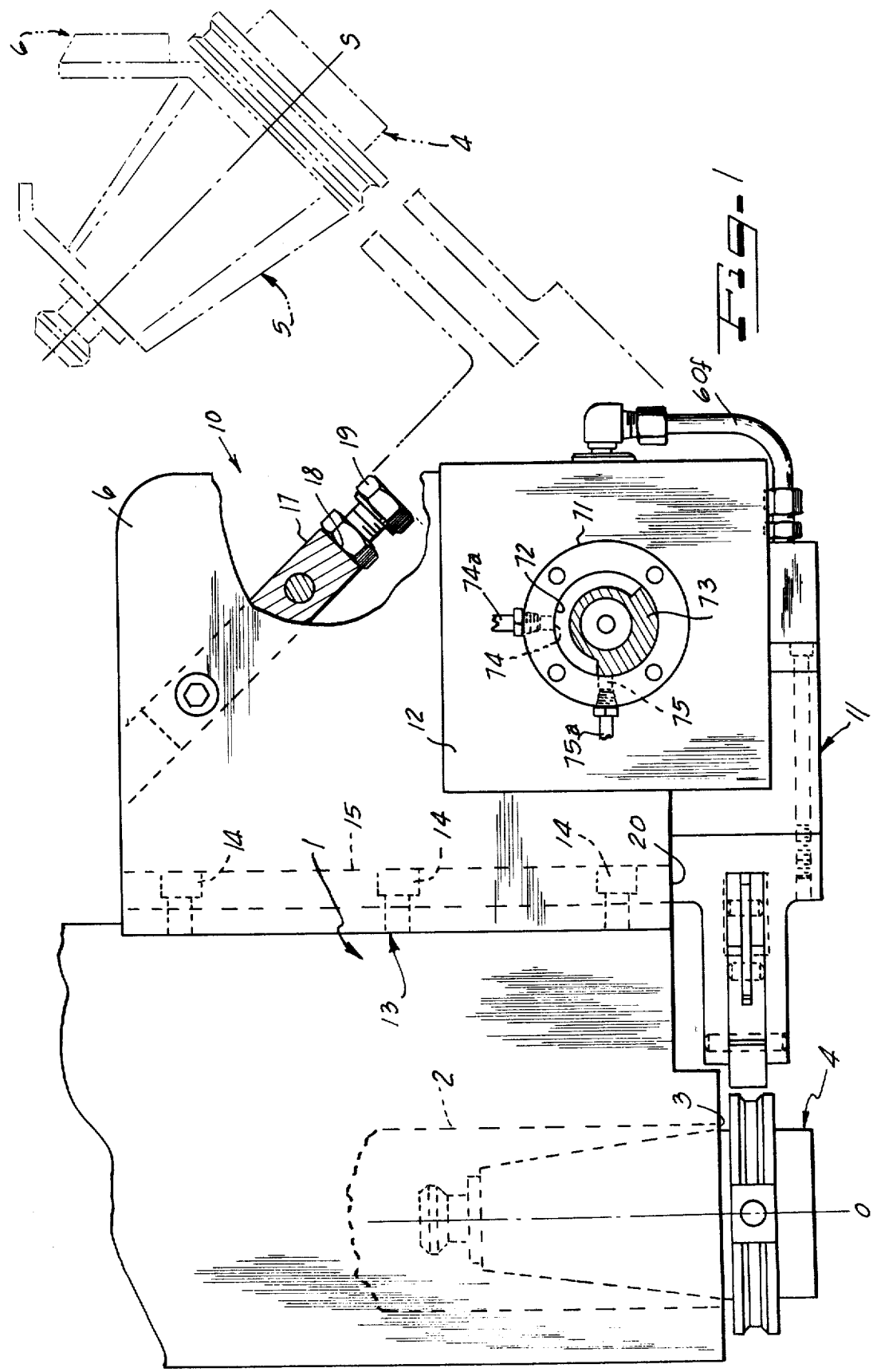

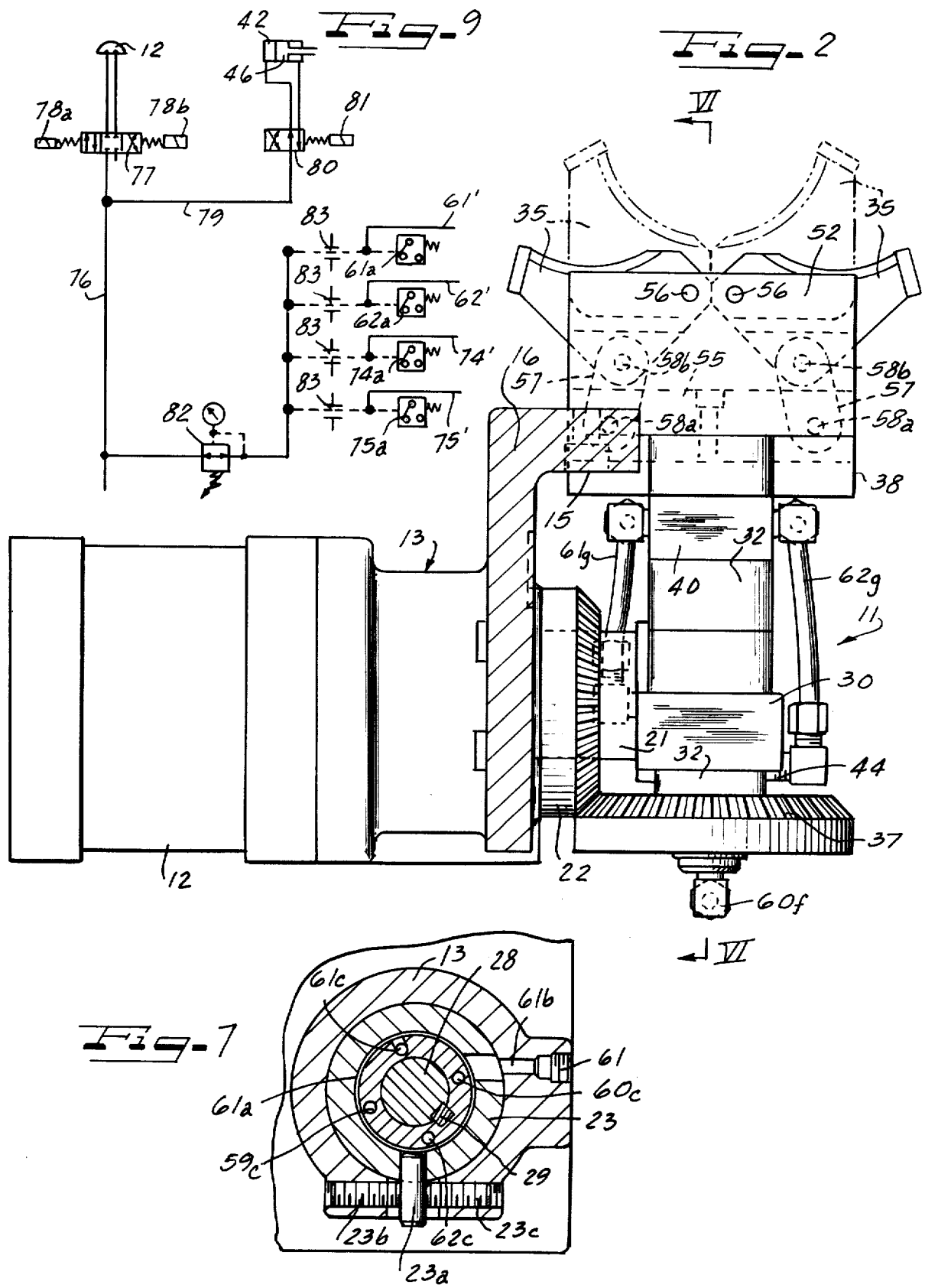

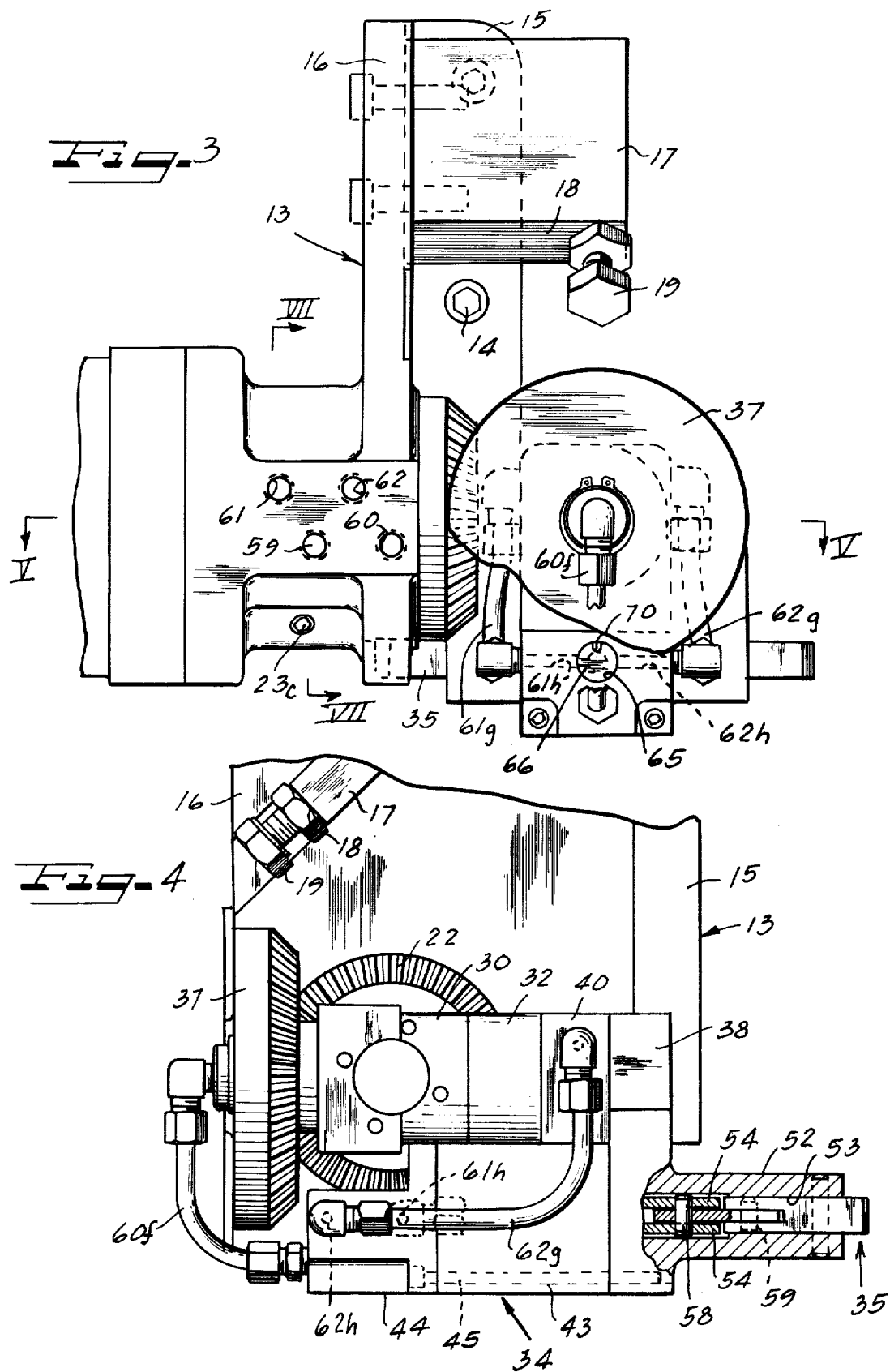

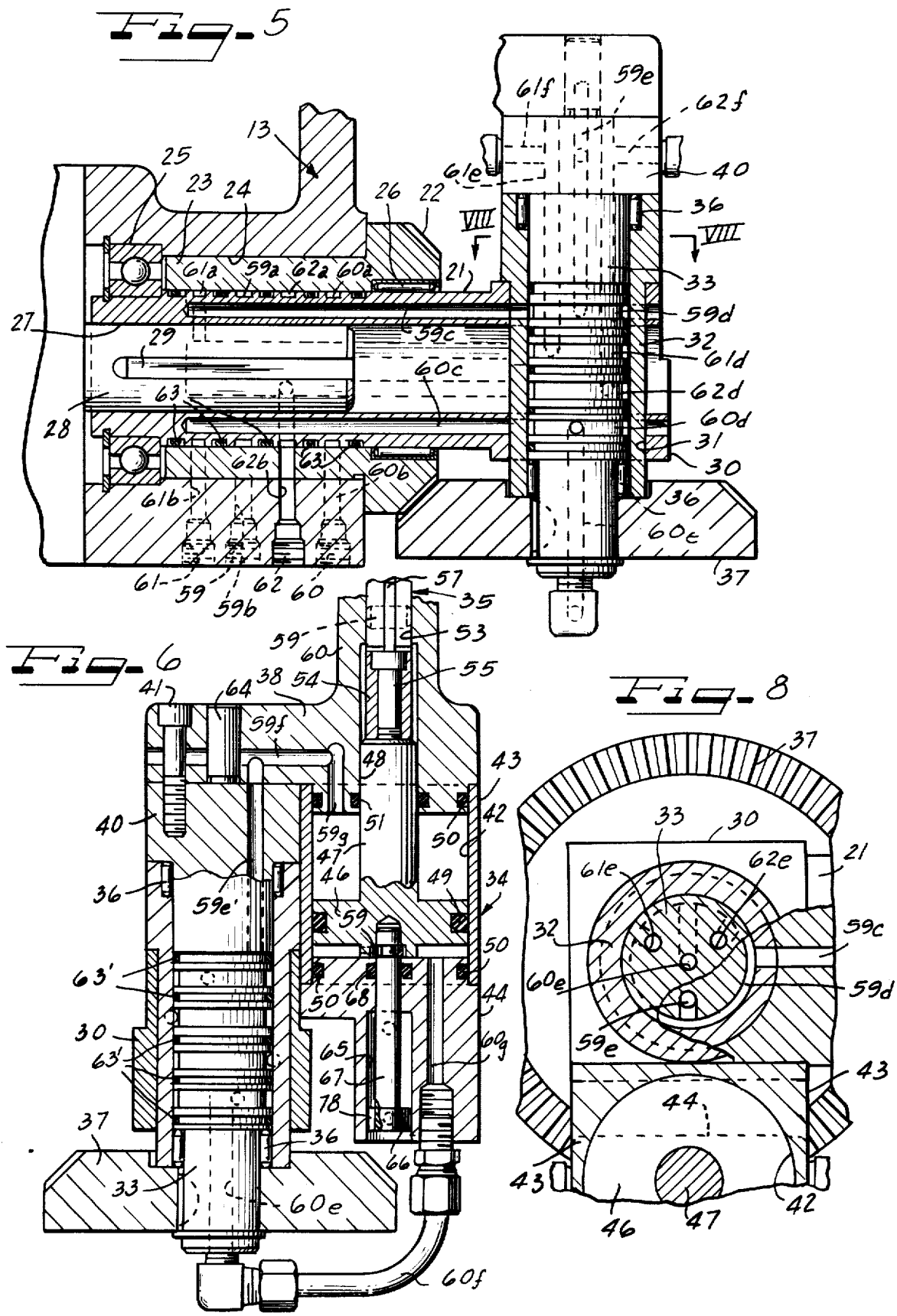

FLUID-ACTUATED TOOL CHANGER WITH DUAL AXIS OF ROTATION

BACKGROUND OF THE INVENTION

The present invention is directed to a tool transport mechanism for machine tools in which an operating spindle may be selectively supplied with a tool, normally carried in an adjacent storage structure, with the tool being transported between the storage structure and the operating spindle of the machine by a transport mechanism which is, for example, automatically controlled by suitable equipment. Such type of machine tool and tool changer are generally disclosed, for example, in U.S. Pat. No. 3,760,490.

In the past the various functions involved in the gripping of a tool prior and during transfer, the withdrawal of the tool from the magazine and/or spindle, transfer of the tool between magazine and spindle, and the insertion of the tool in the magazine and/or spindle, were controlled by a system of actuators adapted to perform the respective functions and a system of control devices to control the actuators, with the operations being monitored by a system of sensors operable to signal the completion of each motion to insure that all motions will be performed in the desired predetermined sequence. A system of interlocks thus was required to insure that proper conditions are present following each motion before the next motion is initiated.

Likewise, usually the insertion and withdrawal of a tool from the storage means involved a different motion between the tool and the storage receiving means, than the motion involved in supplying the tool at the operating spindle. For example, in the previously referred-to patent, the tool is withdrawn axially relative to the spindle but is laterally inserted into the storage magazine. As the tool must be properly oriented when being inserted in the spindle, care must be taken to insure that a change in orientation does not occur during transfer and storage, and it will be appreciated that where the storage reception takes place, for example, in the lateral direction the relative movements involved tend to increase rather than decrease the tendency to shift in orientation.

BRIEF SUMMARY OF THE INVENTION

The invention is directed to a tool transport mechanism adapted to transport a tool between a storage area and the operating station of a machine tool, in which the various motions required to accomplish the desired results are effected in a fixed sequence which insures the completion of one step before the next step is initiated. In the preferred form of the invention illustrated, operation is effected mechanically, and pneumatically or hydraulically, utilizing suitable actuating means for transporting movements and suitable means for actuating the tool-gripping means.

The invention may be readily adapted for application to existing machines as well as built into new equipment and may employ merely two assemblies, one comprising the storage structure, i.e. tool magazine which may have a plurality of tool supporting pockets in which any selected pocket may be disposed on storage axis, from which it may be picked up by a transport structure, also in the form of a unitary assembly readily attachable to a machine tool, with the transport structure having a dual motion, one being a movement about a first pivotal axis to position the transfer arm of the mechanism adjacent either the operating axis of the machine, i.e. of the operating spindle, or adjacent the storage axis, and another movement about a second pivotal axis operative to reverse the position of the gripping means and thus reverse the tool adapter and a tool carried thereby end for end, whereby the adapter and tool associated therewith will be inserted into the storage structure with the same basic motion that it is inserted into the operative spindle of the tool machine. As a result, the tool adapter and tool associated therewith, during engagement and disengagement with either the spindle or the storage structure, have the same motion relative thereto, which in this case is axial as distinguished from lateral or radial, insuring that the rotational orientation of the adapter and tool with respect to the spindle is always maintained and that the adapter and tool are not subjected to rotative forces during the tool interchange.

In a preferred form of the invention, the first pivotal transfer movement is effected by means of a suitable pneumatic actuator or the like, with the second inverting movement taking place automatically by the transmittal of rotative force, produced as a result of the first pivotal movement, being employed to effect the second pivotal movement. More specifically, such embodiment employs a pair of beveled gears, one of which is stationary and the other of which is in fixed relation to the gripping mechanism and adapted to roll on the stationary gear, whereby such rolling movement will automatically effect the desired pivotal movement.

The gripping jaws, by which the tool adapter, and tool carried thereby, may be supported during their transfer movements are adapted to be actuated by a suitable fluid-operated mechanism, for example, a pneumatically or hydraulically actuated cylinder, carried by the transfer arm and suitably connected to a fluid supply under pressure. Proper sequence of operations of the gripping jaws and the movements of the transfer arm are maintained by the use, where necessary, of suitable sensors which monitor respective operating conditions.

The machine spindle and the tool receiving pockets of the magazine may be provided with suitable detent means cooperable with means on each tool adapter to insure retention of the latter in either the tool pocket or the spindle when the transfer arm has reached the corresponding end of its travel, and in the case of the spindle thus retain the adapter in the spindle until it can be firmly locked in operating position by suitable locking means (which, per se, forms no part of the present invention).

BRIEF DESCRIPTION OF THE DRAWINGS

In the drawings wherein like reference characters indicate like or corresponding parts:

FIG. 1 is a top plan view of a transfer mechanism constructed in accordance with the invention, with the mounting means therefore broken away in section;

FIG. 2 is a side elevational view of the structure illustrated in FIG. 1 with a portion of the transport mechanism broken away;

FIG. 3 is a front elevational view of the transport mechanism illustrated as being mounted on the spindle head or housing of a tool machine;

FIG. 4 is a rear elevational view (opposite side of that illustrated in FIG. 3);

FIG. 5 is a longitudinal sectional view taken approximately on the line 5—5 of FIG. 3;

FIG. 6 is a sectional view taken approximately on the line 6—6 of FIG. 2;

FIG. 7 is a sectional view taken approximately on the line 7—7 of FIG. 3;

FIG. 8 is a sectional view taken approximately on the line 8—8 of FIG. 5; and

FIG. 9 is a diagram of the fluid system for actuating the mechanism.

DETAILED DESCRIPTION OF THE INVENTION

General Construction

Referring to the drawings and more particularly to FIG. 1, the reference number 1 indicates generally the spindle housing or head of a machine tool which would normally include a suitable frame structure upon which is supported a workpiece supporting table in known manner, the frame being provided with a pair of vertical ways on which a slide assembly or its equivalent is slidably and adjustably disposed, and which carries the head or spindle housing 1. The latter in turn has a spindle 2 journalled therein and rotatable about a vertical axis with the spindle adapted at its lower end 3 to receive and support a tool adapter and tool 4 carried thereby.

The construction of the machine tool may, for example, be quite similar or correspond to machine tools of the type illustrated in U.S. Pat. No. 3,760,490, and may be suitably constructed for automatic, and, if desired, also manual control.

The tool adapters 4 and tools carried thereby, when not in use are adapted to be stored in a suitable magazine, having a plurality of tool receiving pockets in each of which a tool may be retained and stored. FIG. 1 illustrates one such tool-receiving pocket 5 carried by a suitable tool supporting member or magazine 6, only a portion of which is illustrated. Specific details of the tool supporting member or magazine have not been shown as they form no part of the present invention. Each tool adapter 4 is adapted to receive and support a respective tool which thus may be either stored in the magazine or supplied to the spindle 2. Selection of any desired tool in the magazine may be effective by suitable coding means whereby a selection of a specific tool pocket may be brought into a predetermined tool-change position for subsequent transport to the spindle.

Indicated generally by the reference numeral 10 is a tool changer assembly, mounted on the spindle housing or head 2 at the same side of the machine as the magazine 6 and supporting a tool transfer arm, indicated generally by the reference numeral 11. The latter is suitably movable to the position illustrated in FIG. 1 adjacent the end 3 of the spindle and adapted to support the tool adapter 4 operatively aligned on the operating axis O of the machine, i.e. the axis of the spindle 2, or movable to a position (illustrated in dotted lines in FIG. 1) to adjacent a tool adapter 4, supported in a pocket disposed on the storage axis S, whereby a selected adapter and tool may be transported between the magazine and the spindle 2. The changer assembly 10 also includes a suitable motor, or actuator 12 which, for example, may be pneumatically operated.

Thus, in the operation of the machine tool, assuming that a tool is not disposed in the spindle 2, upon selection of a tool in the magazine 6, the latter is suitably rotated to position the tool pocket 5 of the selected tool on the storage axis S, as illustrated in FIG. 1. The transfer arm 11 may be disposed in the position illustrated in broken lines in FIG. 1, in which it may suitably engage the adapter and tool assembly, move to the position illustrated in solid lines in FIG. 1, transporting the adapter and tool assembly to the spindle 2 in operative alignment on the operating axis O, and release the adapter-tool assembly when the latter has been received in the spindle 2 and supported therein.

The adapter and tool assembly may be supported in the tool pocket 5 as well as initially supported in the spindle 2 by suitable detent means, not illustrated, with the tool ultimately being locked in position in the spindle 2 in known manner, as well as interlocked with respect to rotary driving forces of the spindle on the adapter. An example of one type of such a locking structure between an adapter and spindle, as well as an example of an adapter, is illustrated in U.S. Pat. No. 3,791,258.

The Tool Changer Assembly

The tool changer assembly 10 may include its own base member 13, which may be rigidly secured to the machine tool by suitable means such as bolts 14 which, for example, may be threaded into the spindle housing or head 1. As will be particularly noted from a reference to FIGS. 5 through 8, the base member 13 is generally L-shaped in transverse cross-section, having a side or mounting wall 15 through which the mounting bolts 14 pass, and a front wall 16. Secured to the latter and extending at right angles thereto is an angularly, downwardly directed block 17, the lower free edge 18 of which is provided with an adjustable abutment, indicated generally by the reference numeral 19 and in like manner, the wall 15 is provided with an end face 20 forming an abutment as hereinafter described in detail.

The transfer arm 11 comprises a hollow actuating shaft or member 21 which is supported by the stationary base member 13 for rotation about a fixed axis. Concentric with such axis is a beveled gear 22 having a hollow shank 23 rigidly mounted in a bore 24 in the base member 13 with the shaft 23 being secured to the base member in rigid relation by any suitable means, not illustrated. The member 21 is journaled in the base member by means of a ball bearing assembly indicated generally by the reference numeral 25 which is operatively disposed between the inner end of the shank 21 and the adjacent portion of the base member 13, with the outer end of the member 21 being journaled on roller or needle bearings 26 suitably disposed between the member 21 and the beveled gear 22.

Extending into the hollow bore 27 of the member 21 at the inner end thereof is a drive shaft 28 of the rotary motor 12, the shaft 28 being suitably connected with the member 21, as for example, by means of a key 29 disposed in cooperable keyways in the drive shaft 28 and the member 21, whereby rotation of the shaft 28 will be transmitted to the member 21.

The outer end of the member 21 is provided with an enlarged head portion 30, which in the embodiment illustrated is of generally rectangular shape, having a bore 31 therein the axis of which extends transversely to the axis of the shaft 28 and bore 27. In the embodiment illustrated, the axes extend at right angles to one another. Rigidly mounted in the bore 31 is a hollow tubular member 32 in which is journaled a shaft 33 to which is rigidly connected a supporting member 34 for the gripping jaws 35. The shaft 33 is supported in the member 32 by suitable bearing means such as roller bearings 36 suitably disposed at opposite ends of the member 32.

Rigidly mounted on the shaft 33 is a beveled gear 37 which is meshed with the stationary beveled gear 22. The amount of rotation of the shaft 33 and thus of the gripping mechanism will be determined by the relative sizes of the beveled gears 22, 37 and to insure accurate alignment of the gripping jaws with respect to a tool adapter disposed on the operating axis O or the storage axis S, a fine adjustment of the gear 22 is provided. Referring to Fig. 7, it will be noted that the shank 23 of the beveled gear 22 is retained in stationary non-rotative position by a radially extending pin 23a rigidly secured to the shank 23 within a bore formed therein, with the pin being rigidly retained in stationary position by a pair of set screws 23b and 23c threaded into bores formed in the base member 3. Thus, by backing off one set screw and turning down the other an angular or radial adjustment of the shank 23 may be achieved. As the amount of rotation of the gripping jaws is determined by the gear ratios, i.e. to provide 180° rotation, the adjustment of the shank 23 merely insures that the tooth orientation of the gear 22 is correct whereby the gripping jaws will be properly oriented at the ends of their rotative movement. Consequently, the adjustment of the shank 23 need only involve compensation for normal tolerances in the positioning of the teeth of the gears 22 and 27 relative to the base 18.

The supporting member 34, in the embodiment of the invention illustrated, is fabricated from a plurality of individual pieces and comprises a generally L-shaped member 38 having one leg portion 39 thereof secured to the enlarged head 40 of the shaft 33 by suitable means such as a plurality of bolts 41, only one of which is illustrated in FIG. 6. The member 38 forms one closure member of a cylinder bore 42 formed in a member 43, the opposite end of the bore 42 being closed by a cooperable member 44 with the members 38, 43 and 44 being rigidly secured together by suitable means as for example a plurality of bolts 45 (FIGS. 3 and 4). Reciprocably movable in the cylinder bore 42 is a piston 46 having a piston rod 47 slidably carried in a bore 48 formed in the member 38. As clearly illustrated in FIG. 6, a seal between the piston 46 and the adjacent wall of the bore 42 is effected by a O-ring 49 or other similar sealing member, and in like manner the junctures between the member 43 and members 38 and 44 as well as between the rod 47 and member 38 is respectively effected by similar O-rings or other suitable sealing members 50 and 51.

As illustrated in FIGS. 4 and 6, the other leg portion 52 of the L-shaped member 38 is provided with an elongated slot 53 which extends entirely laterally across the leg 52. Reciprocally mounted in the slot 53 is a cross arm 54 which is rigidly secured to the piston rod 47 by means of a bolt 55 or other suitable means, with the bore 48 intersecting the slot 53. The gripping jaws 35 are disposed in the groove 53 and pivotally connected to the member 52 by respective pins 56 with each of the jaws 35 being operatively connected to the cross arm 54 by respective links 57 which are respectively pivotally connected to the cross arm 34 by a pin 58a and to the associated jaw by a pin 56. Thus, when the piston 46 is in its left-hand position as viewed in FIG. 6 the jaws will be disposed in open positions as illustrated in solid lines in FIG. 2 but when the piston 46 is at its right-hand position the jaws 35 will be disposed in closed positions as illustrated in broken lines in FIG. 2.

The fluid actuated motor 12 and piston 46 may be operated from a common fluid supply under pressure, as for example pneumatically. In the embodiment of the invention illustrated the sensing means for determining the specific position of the transfer arm as well as the open or closed condition of the gripping jaws may be effected by pneumatically operated switches or other suitable means.

FIGS. 5 and 6 illustrate details of the manner in which air under pressure is supplied to the piston 46 as well as providing passageways for air flow utilized in the sensing operation for determining the open or closed positions of the gripping jaws. As illustrated in FIGS. 5 and 3, the base member 13 is provided with respective fluid supply ports 59 and 60 as well as ports 61 and 62 for use in sensing the position of the piston 46.

The supply ports 59 and 60 are operatively connected with the cylinder bore 42 by respective fluid passageways extending from the associated inlet port through the member 21 and shaft 33, and from there by suitable means to the cylinder.

The member 21, as clearly illustrated in FIG. 5, is provided with a plurality of annular grooves 59a, 60a, and 62a which are sealed with respect to the shank 23 of the beveled gear 22 by respective O-rings 63. The respective ports 59–62 are operatively connected to the respective grooves 59a–62a by respective passageways 59b–62b. As illustrated in FIG. 7, the member 21 is provided with a plurality of axially extending bores 59c–62c which extend through the adjacent side wall of the member 32 and communicate with respective grooves 59d–62d formed on the periphery of the shaft 33 and sealed by respective O-rings 63'. Each groove 59d–62d communicates with a respective corresponding axially extending bore 59e–62e in the shaft 33. As illustrated in FIGS. 5 and 6, the passageway 60e extends to the end of the shaft 33 supporting the gear 37, at which it is operatively provided with a fluid conducting tube in the form of an ell which is operatively connected to a similar straight fitting by a tubing, the latter and respective fittings being collectively designated by the reference numeral 60f. The passageway so formed communicates with a passageway 60g in the member 44, the opposite end of which passageway opens on the adjacent end of the cylinder bore 42. Thus, air under pressure may be supplied from the port 60 to the left end of the cylinder bore 42, as illustrated in FIG. 6, by means of which the piston 46 may be moved to the right as viewed in such figure.

In like manner a fluid path may be traced from the port 59 and passageways 59b, groove 59a, passageway 59c, groove 59d in the shaft 33 and passageway 59'e of which is disposed in the member 38 and intersects a passageway 59f formed in the latter, which in the embodiment illustrated extends at right angles to the passageway 59e'. The inner end of the passageway 59f intersects a laterally extending passageway 59g which opens on the right-hand end of the cylinder bore 42 as viewed in FIG. 6. Thus, fluid may be supplied from the port 59 to the right-hand side of the cylinder bore for moving the piston 46 to the left, as viewed in FIG. 6. By appropriate valving of the two lines the piston 46 thereby may be moved to either extreme position of its travel, either opening or closing the gripping jaws 35. In the construction illustrated, the passageway 59f, originally extending to the exterior of the member 38 is blocked intermediate the intersection with the passageway 59c' and the exterior by cylindrical pin or plug 64.

The block 44 is provided with a bore 65 in which is disposed a valve member 66 disposed on the axis of the piston 46 and connected thereto by a connecting rod 67, the inner end of which is suitably connected with the piston 46 and sealed with respect to the exterior by suitable means such as an O-ring 68. In the construction illustrated, the rod 67 is secured to the piston 46 by means of a locking ring 69. The valve member 66 is cooperable with two laterally extending passageways 61h and 62h, the inner ends of which passageways are adapted to be selectively blocked by the valve member 66, in dependence upon the position of the piston 46. Thus, when the piston 46 is in the left-hand position (gripping jaws open) the valve member 66 will close the adjacent end of the passageway 62h and when the piston 46 is at the opposite end of its travel (gripping jaws closed) the valve member 66 will cover the adjacent end of the passageway 61h. The bore 65 may be suitably vented, for example by means of a groove or slot 70 in the valve member 66. The passageways 61h and 62h are operatively connected to their respective ports 61 and 62 by respective series of passageways which may be traced as follows: port 61, passageway 61b, groove 61a, passageway 61c, groove 61d, passageways 61e and 61f and fluid conducting tube 61g which operatively connects the passageways 61f and 61h. In like manner a path may be traced from port 62 through passageway 62b, groove 61a, passageway 62c, groove 62d, passageways 62e and 62f, with the passageways 62f and 62h being operatively connected by fluid conducting tube 62g. The respective tubes 61g and 62g each are provided with terminal fittings at their respective ends for facilitating the desired connections, in the same manner as provided for the tube 60f.

The valve member 66 is cooperable with the respective ports 61 and 62 for providing a sensing criteria by means of which the positions of the gripping jaws 35 may be monitored.

In like manner suitable sensing means may be provided for determining the position of the transfer arm 11 with respect to the operating axis O or the storage axis S of FIG. 1. For example, sensing means similar to that described with respect to the gripping jaws may be provided, which in the embodiment illustrated, is disposed at the front end of the motor 12, the latter being assumed to have a double ended drive shaft 28. Secured to the adjacent end of the motor 12 is a member 71, illustrated as being of generally cylindrical configuration and having a bore 72 therein concentric with the axis of the drive shaft 28. Rigidly mounted on the latter is a valve member 73 which is cooperable with respective ports 74 and 75 in the side wall of the member 71. The ports 74 and 75 may be operatively connected by suitable fluid conducting tubing 74a and 75a or the like to respective fluid actuated sensing means.

FIG. 9 is a semi-diagrammatic figure illustrating a suitable actuating and sensing circuit, utilizing air pressure for operation of the rotary actuator 12 and gripper piston 46 as well as the respective sensing means. In the illustrated arrangement, the actuator 12 is adapted to be supplied with operating air under pressure from a suitable source over a supply line 76 through an electrically operated double-acting valve 77 adapted to be controlled by respective solenoids 78a or 78b, one of which controls the application of power to operate the actuator in one direction and the other solenoid to actuate the actuator in the opposite direction.

The supply line 76 is also connected over a line 79 and single-acting valve 80 to the cylinder 42 for actuation of the gripper piston 46. In this case the valve 80 may normally have a rest position which will apply air to the cylinder bore 42 to maintain the piston 46 in jaw-closing position, and when the valve is actuated by means of a solenoid 81 air will be applied to the piston 46 to move the same into jaw opening position. Sensing switches 61A, 62A, 74A and 75A are all illustrated as being of a pneumatically actuated type which may be operatively connected to receive air pressure from the line 76 over a suitable pressure reducing valve 82. The air inlet side of each valve is adapted to be operatively connected to a cooperable sensing circuit. Thus, the switch 61A is adapted to be connected over a line 61' with the port 61, the switch 62A over the line 62' with the port 62, the switch 74A over the line 74 with the port 74 and the switch 75A over line 75' to the port 75.

The respective switches thus are operable to sense the air pressure in the air supply line thereto each of which is provided with a suitable bleeder valve or the like 83 which is operative to provide an adequate flow of air to the associated switch for proper actuation thereof but prevents an undesired pressure drop in the common supply line to the respective switches. Thus, if any one of the bleeder lines 61', 62', 74 or 75 communicates with the atmosphere (is not blocked by a valve member) air pressure at the associated switch will be insufficient to actuate the same. However, if any one of such bleeder lines is closed by its associated valve member, the air pressure will be permitted to build up at the associated switch to actuate the same. Thus, when the valve member 66 operatively closes the line 61' the switch 61A will be actuated indicating that the grippers are in open position and when the valve member is disposed to close the line 62' the switch 62A will be similarily actuated. Correspondingly, when the line 75' is closed by the valve member 73, the switch 75A will be actuated, indicating that the arm is in its "down" position illustrated in FIG. 1 and when the valve member is in the position to close the line 74' the switch 74A will be actuated, indicating that the arm is in its "up" position illustrated in dotted lines in FIG. 1.

The switches 61A, 62A, 74A, and 75A may be suitably circuited to provide a visual or other indication of the monitored condition or may be suitably interlocked in circuitry for automated operations to restrict continuation of the automatic operation until the movement of the transfer arm or opening and closing of the gripping jaws has been suitably completed.

It will be appreciated that, in normal operation of the machine, pressure will always be applied to one said of the rotary actuator 12 and to one side of the piston 46 for maintaining the associated structure in a desired position until actuation to the other positions of the respective mechanisms.

While I have not illustrated any specific electrical circuitry for actuation of the respective valves 77 and 80 as well as monitoring or interlocking circuits for the switches 61A and 62A, 74A and 75A, specific circuitry to accomplish the desired results may be readily provided by those skilled in the art.

It will be noted from the above description that I have provided a relatively simple arrangement, which is substantially foolproof in operation, all steps thereof being suitably monitored for indication and interlocking purposes. Likewise, the construction incorporates a single transfer arm in which the gripping jaws and support therefor is automatically rotated through 180° as the transfer arm moves from a position on the operating axis of the machine tool to the storage axis of a magazine structure or the like.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim:

1. In a tool transport mechanism for a machine tool having a operating axis on which a tool is operable, and in which a tool is to be transferred between the operating axis of the machine and a tool storage structure having tool-receiving means for supporting a tool on a storage axis, at least a portion of which is spaced from said operating axis, with the tool being supplied to the operating station in predetermined orientation on said operating axis, the combination of a transfer arm, comprising a support member and a cooperable supporting member, the support member being supported for pivotal movement on a fixed first pivotal axis, at least a portion of which is spaced from said operating and said storage axes, means for moving said transfer arm from a first position adjacent said operating axis to a second position adjacent said storage axis, gripping means for releasably gripping a tool positioned either on said operating axis or on said storage axis, comprising a pair of cooperable gripping jaws pivotally supported from said cooperable supporting member, said gripping means including a pair of gripping jaws which are operative to engage cylindrical means on a tool-carrying adapter for approximately half of the circumference of such cylindrical means, such cylindrical means of a tool carrying adapter being provided with a pair of diametrical notches therein, and said jaws are provided with respective inwardly directed projections, each adapted to enter a respective one of said notches, said supporting member being pivotally supported on said support member for pivotal movement thereof and said tool gripping means and a tool carried thereby, about a second pivotal axis extending in a direction transversely to that of said first pivotal axis for selectively orienting said tool-gripping means, and such a tool carried thereby on said operating axis when said arm is in said first position, and on the axis of said tool-receiving means in a relative position corresponding to said predetermined orientation thereof on said operating axis, when said arm is in said second position, whereby said tool is deposited at said tool-receiving means for support thereby, said operating, storage and second pivotal axes lying in a common plane, said first pivotal axis extending perpendicular to such plane and intersecting said second pivotal axis, a power source having a drive member operatively connected with said support member for effecting said pivotal movement thereof, means for effecting pivotal movement of said supporting member relative to said support member about said second pivotal axis, a stationary bevel gear concentric with said first pivotal axis, comprising a second bevel gear rigidly carried by said shaft, with pivotal movement of said arm about said first pivotal axis being operatively transmitted to said shaft, whereby the latter and said gripping means is pivoted about said second axis during movement of said transfer arm about said first axis, and fluid-actuated means carried by said arm for selectively actuating said gripping means to and from tool-gripping and tool-releasing position.

2. A tool transport mechanism according to claim 1, wherein said actuating means comprises linkage connected to said gripping jaws, and includes a cylinder, and a fluid actuated piston movable therein operatively connected to said linkage for effecting predetermined movement thereof, and thus of said jaws.

3. A tool transport mechanism according to claim 2, wherein said transfer arm is provided with an actuation member journaled for rotary movement in a fixed supporting structure, said means for moving said transfer arm comprising a fluid-actuated motor having a rotary drive shaft operatively connected to said actuation shaft, said supporting structure having a plurality of fluid ports therein, and passageways extending from the respective fluid ports through portions of said supporting structure, actuation member of said transfer arm and said shaft of said jaw supporting member, and fluid conducting means, carried by the latter, operatively connecting the adjacent end of one such passageway to one side of said cylinder and the adjacent end of another such passageways to the other side of said cylinder, for the conduction of actuating fluid thereto.

4. A tool transport mechanism according to claim 3, comprising means operatively connected with said piston for sensing the respective end positions of the travel thereof, and thus the open or closed positions of said gripping jaws.

5. A tool transport mechanism according to claim 1, comprising in further combination sensing means responsive to movement of said transfer arm, operable when said gripping means is operatively disposed either at said operating axis or said storage axis, adapted to provide a criterion for the control of means for restricting operative actuation of said actuating means to tool-releasing position when said transfer arm is intermediate said two positions thereof.

6. A tool transport mechanism according to claim 5, comprising means operatively connected with said actuating means for said gripping jaws for sensing the respective end positions of the travel thereof, and thus the open or closed positions of said gripping jaws.

7. In a tool transport mechanism for a machine tool having an operating axis on which a tool is operable, and in which a tool is to be transferred between the operating axis of the machine and a tool storage structure having tool-receiving means for supporting a tool on a storage axis, at least a portion of which is spaced from said operating axis, with the tool being supplied to the operating station in predetermined orientation on said operating axis, the combination of a transfer arm, provided with an actuation member journaled for rotary movement in a fixed supporting structure, for pivotal movement of said transfer arm on a fixed first pivotal axis, at least of portion of which is spaced from said operating and said storage axes, a fluid-actuated motor having a rotary drive shaft operatively connected to said actuation member, for moving said transfer arm from a first position adjacent said operating axis to a second position adjacent said storage axis, gripping means for releasably gripping a tool positioned either on said operating axis or on said storage axis, a shaft journaled in said transfer arm on a second pivotal axis, said shaft being rigidly connected to a supporting member for said gripping means whereby the latter is movable therewith, said supporting structure having a plurality of fluid ports therein, and passageways extending from the respective fluid ports through portions of said supporting structure, actuation member of said transfer arm and said shaft of said supporting member for said gripping means, and fluid conducting means, carried by said lastmentioned supporting member, operatively connecting the adjacent end of one such passageway to one side of said cylinder and the adjacent end of another such passageways to the other side of said cylinder, for the conduction of actuating fluid thereto, pivotal movement of said tool gripping means, and a tool carried thereby about said second pivotal axis selectively orienting said tool-gripping means, and such a tool carried thereby, on said operating axis when said arm is in said first position, and on the axis of said tool-receiving means in a relative position corresponding to said predetermined orientation thereof on said operating axis, when said arm is in said second position, whereby said tool is deposited at said tool-receiving means for support thereby, fluid-actuated means carried by said arm for selectively actuating said gripping means to and from tool-gripping and tool-releasing position, said actuating means comprises linkage connected to said gripping means, and includes a cylinder, and a fluid actuated piston movable therein operatively connected to said linkage for effecting predetermined movement thereof, and thus of said gripping means, and means operatively connected with said piston for sensing the respective end positions of the travel thereof, and thus the open or closed positions of said gripping means, and comprising a valve member movable with said piston and cooperable with a pair of ports in a member carried by said jaw supporting member, for control of fluid actuated control means associated with the fluid supply for said piston.

8. A tool transport mechanism according to claim 7, wherein said passageways include one for each of said ports in said jaw supporting member, and fluid conducting means carried by said supporting member operatively connecting the adjacent ends of said last mentioned passageways to respective ports in said jaw supporting member.

9. A tool transport mechanism according to claim 8, comprising means operatively movable with said transfer arm for sensing the respective end positions of the travel thereof, and thus the respective first and second positions of said transfer arm.

10. A tool transport mechanism according to claim 9, sensing means comprises a valve member movable with said transfer arm and cooperable with a plurality of ports in a stationary member cooperable with said valve member, for control of fluid actuated control means associated with the fluid supply for said motor.

11. A tool transport mechanism according to claim 10, wherein said actuation shaft is of tubular construction and provided with a plurality of circumferential grooves in the other periphery thereof, each axially aligned with a respective one of said ports in said supporting structure, said passageways in said actuation shaft extending in axial direction and intersecting respective circumferential grooves in the periphery of the shaft of said jaw supporting member, the passageways in said last-mentioned shaft extending axially therein and communicating at one end with a respective circumferential groove therein and at the opposite end with said fluid conducting means to said cylinder, (and to said sensing ports).

12. A tool transport mechanism according to claim 11, wherein said fluid conducting means comprises respective sections of fluid-conducting tubing.

13. In a tool transport mechanism for a machine tool having an operating axis on which a tool is operable, and in which a tool is to be transferred between the operating axis of the machine and a tool storage structure having tool-receiving means for supporting a tool on a storage axis, at least a portion of which is spaced from said operating axis, with the tool being supplied to the operating station in predetermined orientation on said operating axis, the combination of a transfer arm, provided with an actuation member journaled for rotary movement in a fixed supporting structure, for pivotal movement of said transfer arm on a fixed first pivotal axis, at least of portion of which is spaced from said operating and said storage axes, a fluid-actuated motor having a rotary device shaft operatively connected to said actuation member, for moving said transfer arm from a first position adjacent said operating axis to a second position adjacent said storage axis, gripping means for releasably gripping a tool positioned either on said operating axis or on said storage axis, a shaft journaled in said transfer arm on a second pivotal axis, said shaft being rigidly connected to a supporting member for said gripping means whereby the latter is movable therewith, said supporting structure having a plurality of fluid ports therein, and passageways extending from the respective fluid ports through portions of said supporting structure, actuation member of said transfer arm and said shaft of said supporting member for said gripping means, and fluid conducting means, carried by said last mentioned supporting member, operatively connecting the adjacent end of one such passageway to one side of said cylinder and the adjacent end of another such passageways to the other side of said cylinder, for the conduction of actuating fluid thereto, a stationary bevel gear concentric with said first pivotal axis, a second bevel gear rigidly carried by said shaft, with pivotal movement of said arm about said first pivotal axis being operatively transmitted to said shaft, whereby the latter and said gripping means is pivoted about said second axis during movement of said transfer arm about said first axis, pivotal movement of said tool gripping means, and a tool carried about said second pivotal axis selectively orienting said tool-gripping means, and such a tool carried thereby, on said operating axis when said arm is in said first position, and on the axis of said tool-receiving means in a relative position corresponding to said predetermined orientation thereof on said operating axis, when said arm is in said second position, whereby said tool is deposited at said tool-receiving means for support thereby, fluid-actuated means carried by said arm for selectively actuating said gripping means to and from tool-gripping and tool-releasing position, said actuating means comprises linkage connected to said gripping means, and includes a cylinder, and a fluid actuated piston movable therein operatively connected to said linkage for effecting predetermined movement thereof, and thus of said gripping means, and means operatively connected with said piston for sensing the respective end positions of the travel thereof, and thus the open or closed positions of said gripping means, and comprising a valve member movable with said piston and cooperable with a pair of ports in a member carried by said jaw supporting member, for control of fluid actuated control means associated with the fluid supply for said piston.

14. In a tool transport mechanism for a machine tool having an operating axis on which a tool is operable, and in which a tool is to be transferred between the operating axis of the machine and a tool storage structure having tool-receiving means for supporting a tool on a storage axis, at least a portion of which is spaced from said operating axis, with the tool being supplied to the operating station in predetermined orientation on said operating axis, the combination of a transfer arm supported for pivotal movement on a fixed first pivotal axis, at least of portion of which is spaced from said operating and said storage axes, means for moving said transfer arm from a first position adjacent said operating axis to a second position adjacent said storage axis, said transfer arm having gripping means for releasably gripping a tool positioned either on said operating axis or on said storage axis, means connected to said transfer arm for effecting a pivotal movement of said tool gripping means and a tool carried thereby, about a second pivotal axis extending in a direction transversely to that of said first pivotal axis for selectively orienting said tool-gripping means, and such a tool carried thereby on said operating axis when said arm is in said first position, and on the axis of said tool-receiving means in a relative position corresponding to said predetermined orientation thereof on said operating axis, when said arm is in said second position, whereby said tool is deposited at said tool-receiving means for support thereby, fluid-actuated means carried by said arm for selectively actuating said gripping means to and from tool-gripping and tool-releasing position, sensing means responsive to movement of said transfer arm, operable when said gripping means is operatively disposed either at said operating axis or said storage axis, adapted to provide a criterion for the control of means for restricting operative actuation of said actuating means to tool-releasing position when said transfer arm is intermediate said two positions thereof, and means operatively connected with said actuating means for said gripping jaws for sensing the respective end positions of the travel thereof, and thus the open or closed positions of said gripping jaws, said lastmentioned means comprising a valve member movable with said actuating means and cooperable with a pair of ports in a member carried by said jaw supporting member, for control of fluid actuated control means associated with the fluid supply for said actuating means.

* * * * *